United States Patent
West et al.

(10) Patent No.: US 6,867,373 B2
(45) Date of Patent: Mar. 15, 2005

(54) SPRINKLER RESISTANT TAP-OFF BASE ASSEMBLY

(75) Inventors: Rodney J. West, Liberty, IN (US); Glenn S. O'Nan, Oxford, OH (US)

(73) Assignee: Square D Company, Palatine, IL (US)

( * ) Notice: Subject to any disclaimer, the term of this patent is extended or adjusted under 35 U.S.C. 154(b) by 13 days.

(21) Appl. No.: 10/172,821

(22) Filed: Jun. 14, 2002

(65) Prior Publication Data

US 2003/0230426 A1 Dec. 18, 2003

(51) Int. Cl.[7] .................. H01R 13/447; H02G 5/06
(52) U.S. Cl. .................. 174/101; 174/48; 174/68.2; 174/99 B; 439/211
(58) Field of Search .................. 439/207, 211; 174/48, 68.1, 68.2, 72 B, 96–98, 99 B, 101

(56) References Cited

U.S. PATENT DOCUMENTS

| | | | | |
|---|---|---|---|---|
| 4,673,229 A | * | 6/1987 | Jorgensen et al. | 439/207 |
| 4,714,431 A | * | 12/1987 | McGoldrick et al. | 439/212 |
| 4,897,048 A | * | 1/1990 | Liebon et al. | 439/211 |
| 5,192,217 A | * | 3/1993 | Wittmer | 439/211 |
| 5,316,490 A | * | 5/1994 | Clemence et al. | 439/207 |
| 5,415,557 A | * | 5/1995 | Chapman et al. | 439/142 |
| 5,525,068 A | * | 6/1996 | Graham et al. | 439/114 |
| 5,670,743 A | * | 9/1997 | Welch et al. | 174/49 |
| 6,022,231 A | * | 2/2000 | Williams et al. | 439/207 |
| 6,265,666 B1 | * | 7/2001 | Faulkner | 174/99 B |
| 6,329,598 B1 | * | 12/2001 | M'Sadoques et al. | 174/68.2 |
| 6,384,327 B1 | * | 5/2002 | Bellanger | 174/48 |
| 6,452,096 B1 | * | 9/2002 | Childers | 174/48 |
| 6,459,587 B1 | * | 10/2002 | Chan | 174/68.2 |

* cited by examiner

*Primary Examiner*—Dean A. Reichard
*Assistant Examiner*—Adolfo Nino

(57) ABSTRACT

A sprinkler and drip resistant tap-off base for an electrical busway distribution system. The tap-off base includes an overmolded perimeter seal providing a liquid resistant seal between the busway housing and the tap-off base and between the tap-off base and a tap-off unit installed on the tap-off base.

19 Claims, 7 Drawing Sheets

SPRINKLER RESISTANT TAP-OFF BASE ASSEMBLY

CROSS-REFERNCE TO RELATED PATENTS

Not applicable

STATEMENT REGARDING FEDERALLY SPONSORED RESAEARCH OR DEVELOPMENT

Not applicable

FIELD OF THE INVENTION

The present invention relates to the field of electrical distribution, and particularly to a busway tap-off base.

BRIEF DESCRIPTION OF THE DRAWINGS

The features of the invention will become more clearly understood from the following detailed description of the invention read together with the drawings in which.

Figure 1:
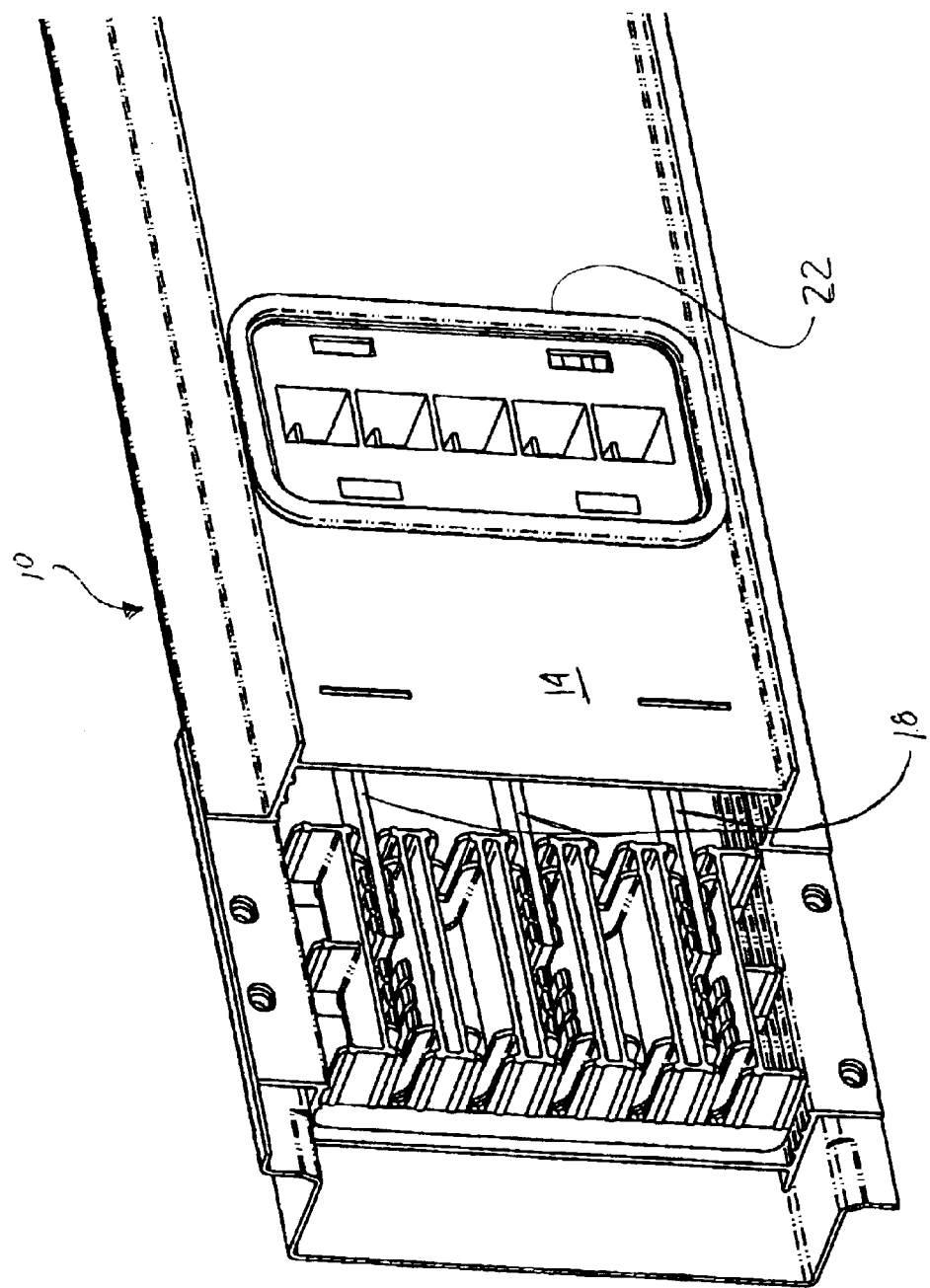
FIG. 1 illustrates a busway device employing a tap-off base constructed in accordance with the present invention.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates a plug-in busway electrical distribution device 10 as is known in the industry. The busway device 10 includes a housing 14 enclosing a number of electrical conductors 18. The housing 14 is provided with tap-off openings (not show) for providing access to the electrical conductors 18 at intervals along its length. A tap-off base 22, which provides support, electrical separation and a means for selectively providing access to the enclosed electrical conductors 18, is provided for each tap-off opening. The tap-off base 22 shown in this illustration is constructed in accordance with the present invention.

Figure 2:
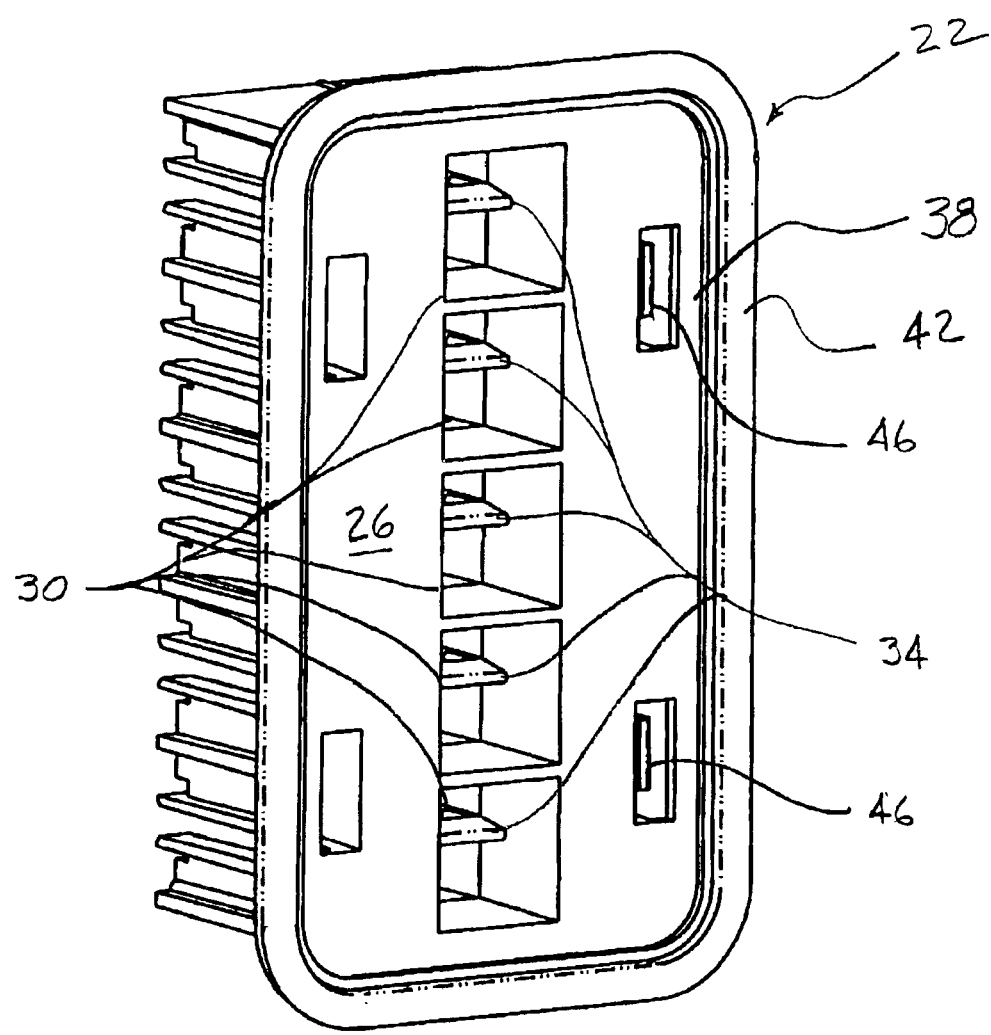
FIG. 2 is a front view of a tap-off base constructed in accordance with the present invention.

FIG. 2 illustrates a front view of the tap-off base 22 of FIG. 1. The tap-off base 22 is molded from an electrically insulating material and has a generally flat front surface 26. An aperture 30 is provided for accessing each of the electrical conductors 18 enclosed within the housing 14. Each aperture 30 includes a guide bar 34 which covers the edge of the conductor 18. The guide bar 34 has a generally wedge shaped cross-section which assists the plug-in jaws of a tap-off unit in sliding onto the conductor 18. The guide bar 34 also helps to prevent unintentional finger contact with the conductors 15. The front of the tap-off base 22 has an outwardly extending perimeter flange 38 (best shown in FIG. 5) which is significantly covered by an overmolded perimeter seal 42. The material used for the overmolded perimeter seal 42 is sufficiently pliable (rigid but deforming slightly under pressure) that a liquid resistant seal can be formed between the tap-off base 22 and the busway housing 18, when the tap-off base 22 is properly installed thereon. The tap-off base 22 is attached to the busway housing 14 by flexible retaining tabs 46, which engage an inside surface of the busway housing 14 when the tap-off base 22 is properly installed in a tap-off opening.

Figure 3:
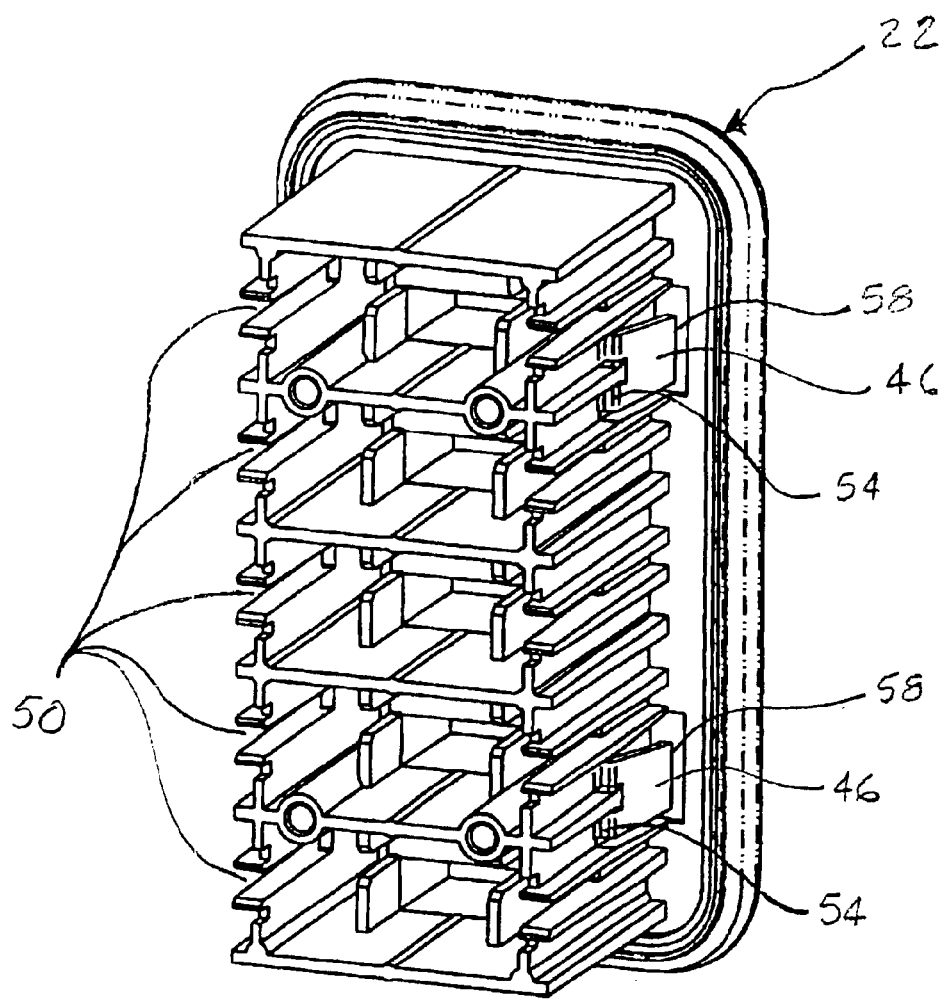
FIG. 3 is a rear view of a tap-off base constructed in accordance with the present invention.

FIG. 3 illustrates a rear view of a tap-off base 22, constructed in accordance with the present invention. The tap-off base 22 includes support slots 50, which receive the conductors 18 to provide electrical separation and support. In this view it can be seen that the retaining tabs 46 have a first end 54 that is integrally connected to the tap-off base 22 and a distal end 58, which engages the inside surface of the busway housing 14.

Figure 4:
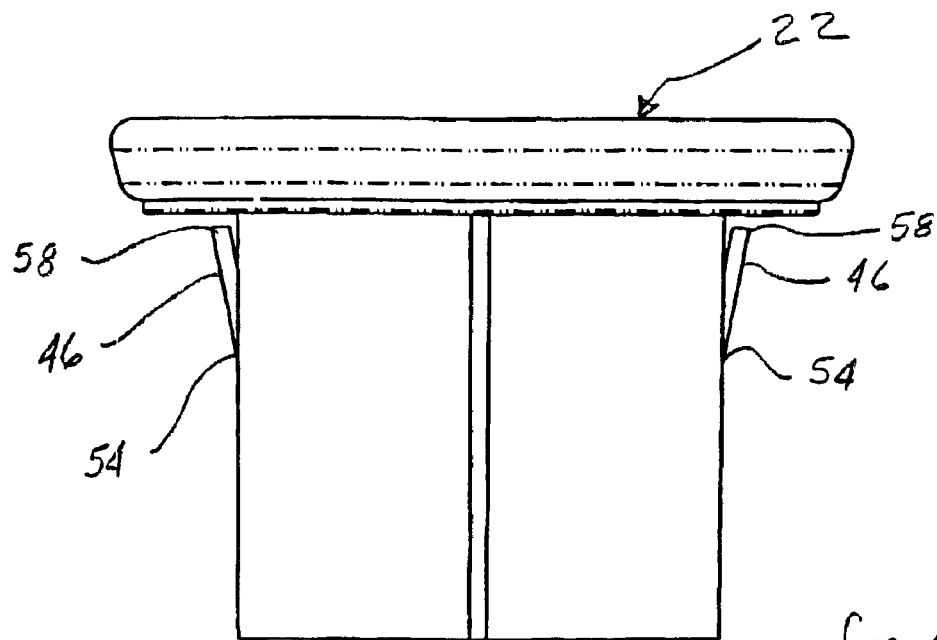
FIG. 4 is an end view of a tap-off base constructed in accordance with the present invention.

FIG. 4 illustrates an end view of a tap-off base 22, constructed in accordance with the present invention. In this view the configuration of the retaining tabs 46 and their first and distal ends, 54 and 58, respectively, can be seen.

Figure 5:
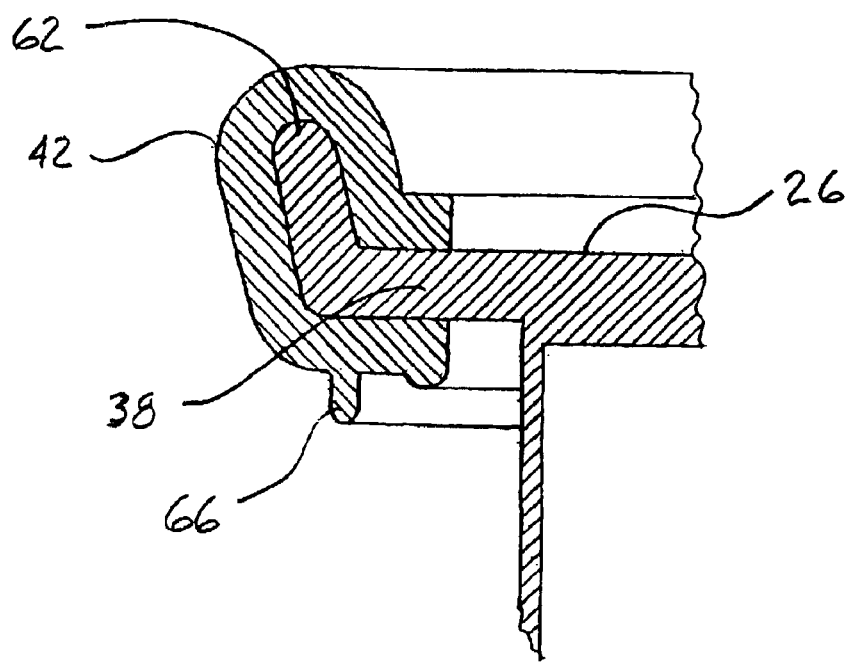
FIG. 5 is a detailed cross-sectional view of the perimeter flange and overmolded seal.

FIG. 5 illustrates in cross-section the perimeter flange 38 and overmolded perimeter seal 42. The perimeter flange 38 extends outwardly from the generally flat front surface 26 ending in an upturned distal end 62. The overmolded perimeter seal 42 generally conforms to the shape of the perimeter flange 38 and includes a sealing rib 66, which provides a liquid resistant seal between the tap-off base 22 and the busway housing 14. The portion of the perimeter seal 42 covering the upturned distal end 62 of the perimeter flange 38 provides a seal between the tap-off base 22 and a rear wall 70 (FIG. 9) of a tap-off unit installed on the tap-off base 22.

Figure 6:
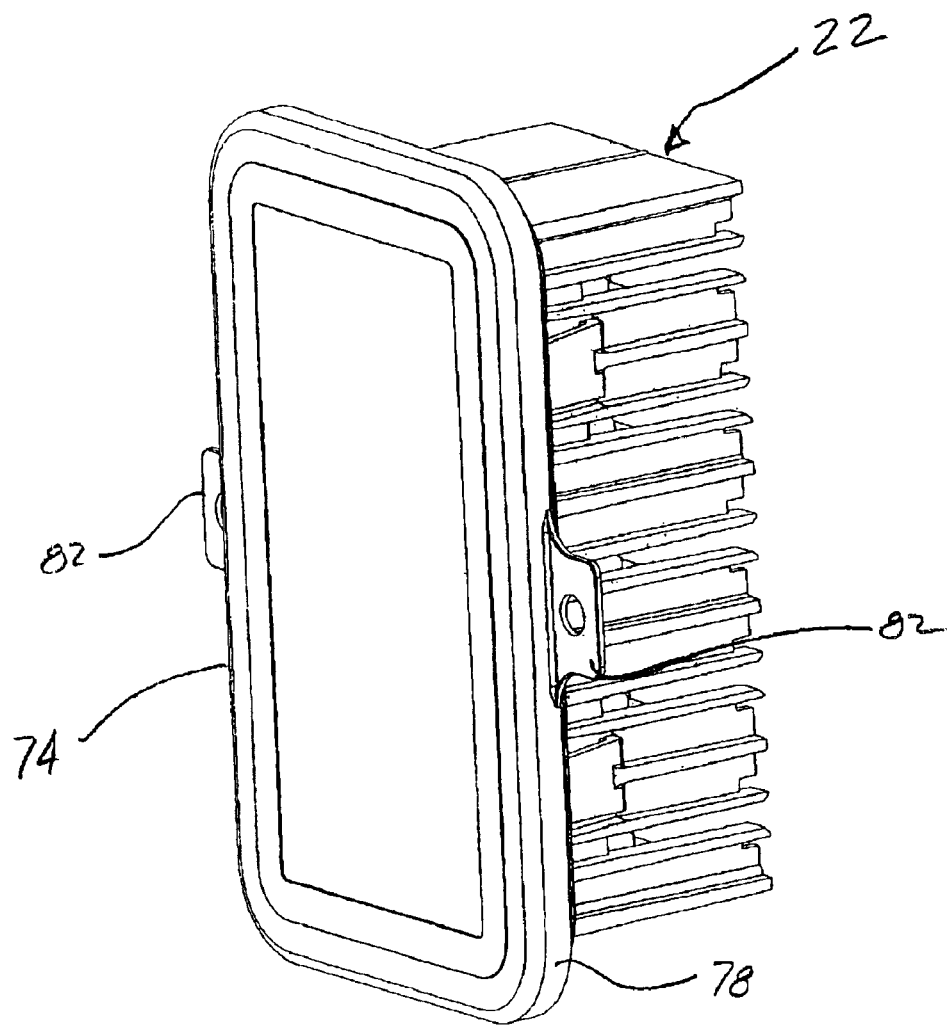
FIG. 6 illustrates the tap-off base of FIG. 2 with a snap-on cover installed.

FIG. 6, illustrates a tap-off base 22 with a snap-on cover 74, constructed in accordance with the present invention, installed thereon. The cover 74 is generally rectangular in shape with a perimeter flange 78. In this view and in the cross-sectional view of FIG. 8, it can be seen that the snap-on cover 74 significantly covers the overmolded perimeter seal 42, thereby preventing one looking at the plug-in busway device 10 from easily seeing the overmolded perimeter seal 42. Therefore, selecting a color for the overmolded perimeter seal 42, which is highly visible from a significant distance and has a high contrast to the colors of the busway housing 14, the tap-off base 22 and the cover 74, permits one to easily determine, from a significant distance, whether the cover 74 is installed on the tap-off base 22. The significant distance would be that distance from the floor of a manufacturing location to some point at or near the roof of that manufacturing location, where a plug-in busway device 10 might be installed. It is to be understood that the color of the snap-on cover 74 could be selected such that it was highly visible and had significant contrast to the colors of the plug-in busway housing 14 and tap-off base 22, thus providing the same results. The integrally formed tabs 82 aid in removing the cover 74 and provide a means for securing the cover 74 to the busway device 10 or the installed tap-off unit such that it will be available for future use should the tap-off unit be removed.

Figure 7:
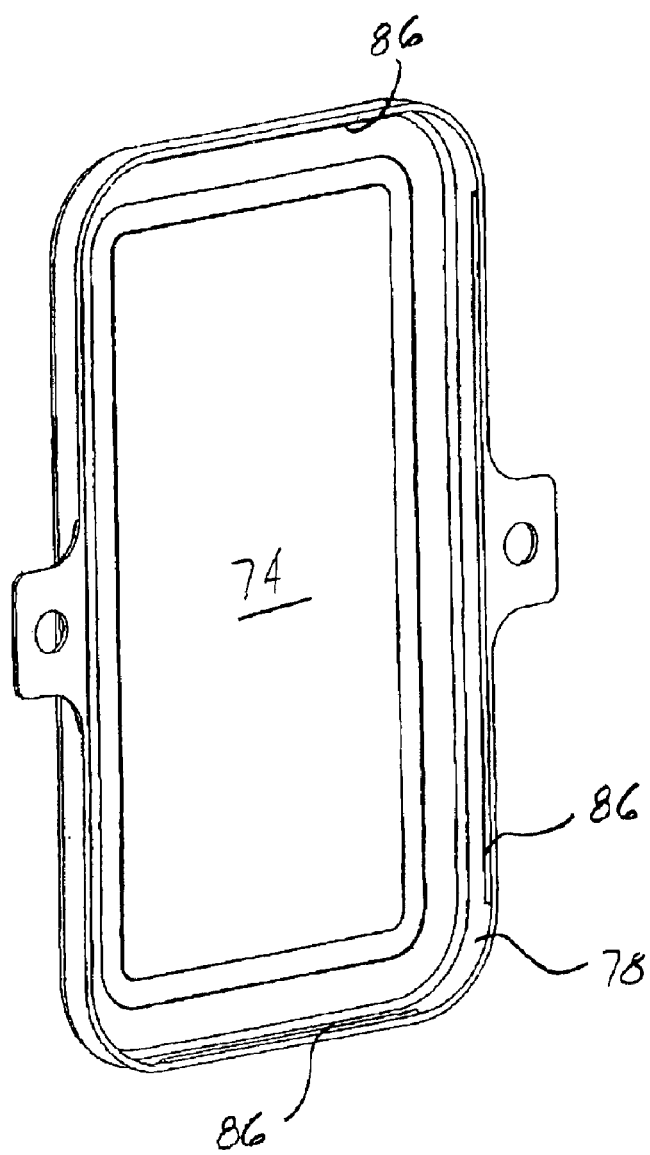
FIG. 7, is a view of the inside of the snap-on cover of FIG. 6.

FIG. 7 illustrates a view of the inside of the cover 74 of FIG. 6. The perimeter flange 78 includes an inwardly facing rib 86 which snaps over that portion of the overmolded perimeter seal 42 covering the upturned distal end 62 of the perimeter flange 38, thereby holding the cover 74 on the tap-off base 22.

FIG. 7 illustrates a view of the inside of the cover 74 of FIG. 6. The perimeter flange 82 includes an inwardly facing rib 86 which snaps over that portion of the overmolded perimeter seal 42 covering the upturned distal end 62 of the perimeter flange 38, thereby holding the cover 74 on the tap-off base 22 and providing a liquid resistant seal between the cover 74 and the tap-off base 22.

Figure 8:
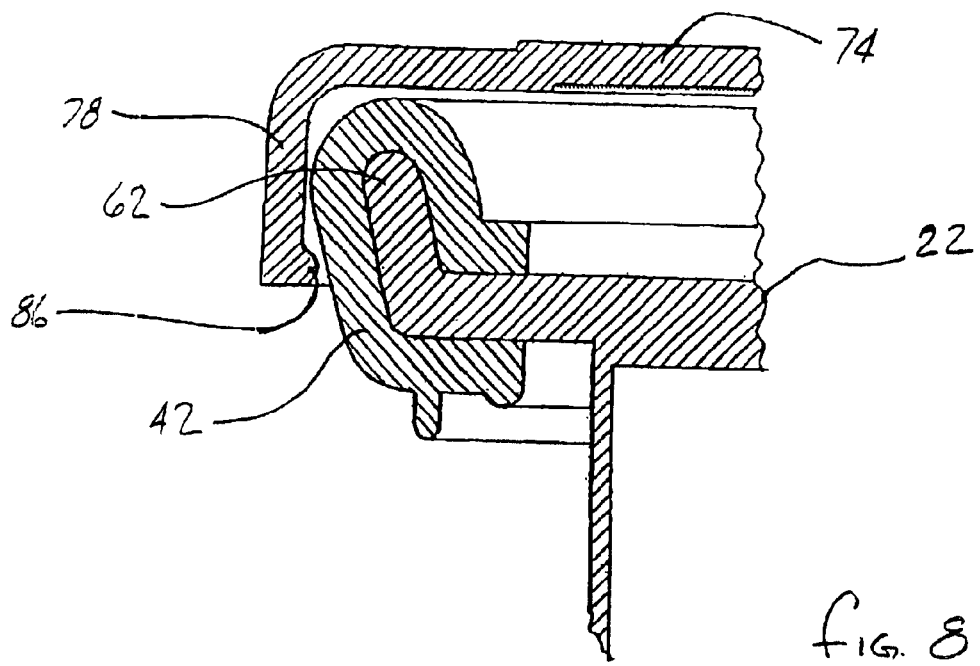
FIG. 8 is a detailed cross-sectional view of the perimeter flange and overmolded seal with the snap-on cover installed.

FIG. 8 illustrates in cross-section the attachment of the cover 74 to the tap-off base 22, as described in reference to FIG. 7.

Figure 9:
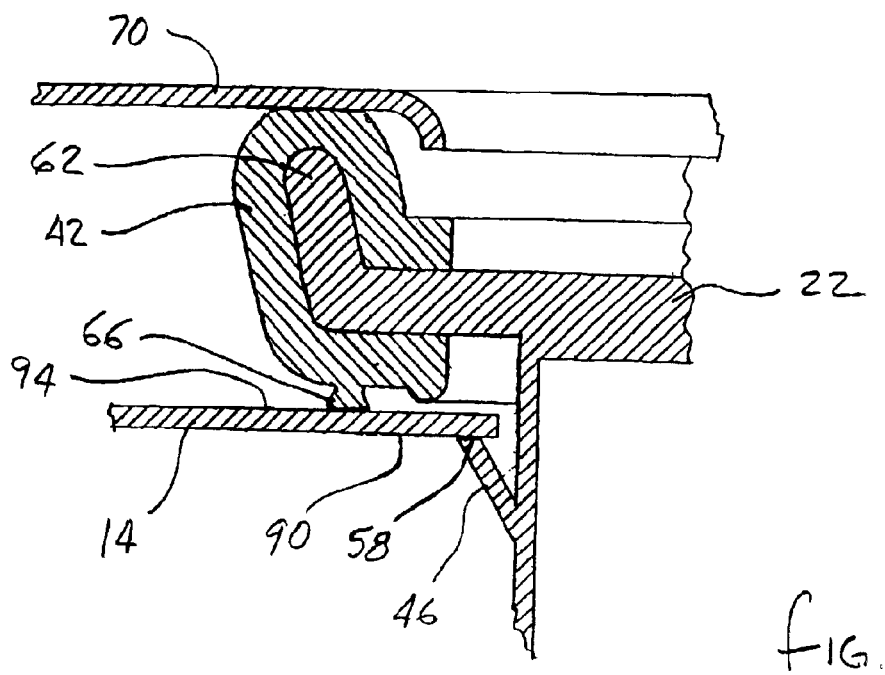
FIG. 9 is a detailed cross-sectional view of the perimeter flange and overmolded seal illustrating the seal between the busway housing and the perimeter seal and between an installed tap-off unit and the perimeter seal.

FIG. 9 illustrates in cross-section the interactions of the perimeter flange 38 and overmolded seal 42 with the plug-in busway housing 14 and rear wall 70 of the installed tap-off unit in establishing a liquid resistant seal. When the tap-off base 22 is properly installed on the busway device 10, the distal ends 58 of the retaining tabs 46 engage an inside surface 90 of the housing 14, causing the sealing rib 66 of the overmolded perimeter seal 42 to be compressed between the perimeter flange 38 of the tap-off base 22 and an outside surface 94 of the housing 14, thereby establishing a liquid resistant seal between the busway housing 14 and the tap-off base 22. When a tap-off unit is installed on one of the tap-off bases 22, the overmolded perimeter seal 42 is compressed between the rear wall 70 of the tap-off unit and the upturned distal end 62 of the perimeter flange 38, thereby establishing a liquid resistant seal between the tap-off unit and the tap-off base 22.

We claim:

1. A sprinkler resistant tap-off base comprising:
a tap-off base molded from an electrically insulating material, said tap-off base having an overmolded perimeter seal molded over a perimeter flange extending from a front surface of said tap-off base, said overmolded seal being sufficiently pliable to provide a liquid resistant seat between said tap-off base and a busway electrical distribution system housing when said tap-off base is properly installed thereon; and
a removable cover installed on said tap-off base such as to significantly overlap said overmolded perimeter seal.

2. The tap-off base of claim 1, wherein said tap-off base is attached to said housing by flexible retaining tabs, which engage an inside surface of said housing.

3. The tap-off base of claim 1, wherein a color for said overmolded seal is selected to be highly visible from a significant distance and having a high contrast to the colors of said tap-off base, said busway housing and said cover, thereby allowing one to easily determine if said cover is in place from said significant distance.

4. The tap-off base of claim 1, wherein a color for said cover is selected to be highly visible from a significant distance and having a high contrast to the colors of said tap-off base and said busway housing, thereby allowing one to easily determine if said cover is in place from said significant distance.

5. A sprinkler resistant tap-off base comprising:
a tap-off base molded from an electrically insulating material; and
an overmolded perimeter seal providing a liquid resistant seal between said tap-off base and a busway electrical distribution system housing on which said tap-off base is installed and between said tap-off base and a tap-off unit cover installed on said tap-off base.

6. The tap-off base of claim 5, wherein said perimeter seal is molded over a perimeter flange extending outwardly from a front surface of said tap-off base.

7. The tap-off base of claim 6, wherein said perimeter flange defines an upturned distal end, which provides a sealing surface for said tap-off unit.

8. The tap-off base of claim 5, wherein said perimeter seal includes a sealing rib which provides said liquid resistant seal between said tap-off base and said busway housing.

9. A sprinkler resistant tap-off base comprising:
a tap-off base molded from an electrically insulating material and defining flexible retainers for securing said tap-off base to a busway electrical distribution system housing by engaging an inside surface of said housing;
a seal providing a liquid resistant seal between said tap-off base and said housing; and
a cover installed on said tap-off base such as to significantly overlap said seal such that a liquid resistant seal between said tap-off base and said cover is obtained.

10. The tap-off base of claim 9, wherein said seal is molded over a perimeter flange extending from a front surface of said tap-off base.

11. The tap-off base of claim 10, wherein said seal significantly covers said perimeter flange.

12. The tap-off base of claim 11, wherein said perimeter flange defines an upturned distal end, which provides a sealing surface for said cover.

13. The tap-off base of claim 11, wherein said seal includes a sealing rib which provides said liquid resistant seal between said tap-off base and said busway housing.

14. The tap-off base of claim 9, wherein a color for said seal is selected to be highly visible from a significant distance and having a high contrast to the colors of said tap-off base, said busway housing and said cover, thereby allowing one to easily determine if said cover is in place from said significant distance.

15. The tap-off base of claim 9, wherein a color for said cover is selected to be highly visible from a significant distance and having a high contrast to the colors of said tap-off base and said busway housing, thereby allowing one to easily determine if said cover is in place from said significant distance.

16. A sprinkler resistant tap-off base comprising:
a tap-off base molded from an electrically insulating material and having a perimeter seal providing a liquid resistant seal between said tap-off base and a busway electrical distribution system housing on which said tap-off base is installed and between said tap-off base and a tap-off unit installed on said tap-off base.

17. The tap-off base of claim 16, wherein said perimeter seal is molded over a perimeter flange extending outwardly from a front surface of said tap-off base.

18. The tap-off base of claim 17, wherein said perimeter flange defines an upturned distal end, which provides a sealing surface for a rear wall of said tap-off unit.

19. The tap-off base of claim 16, wherein said perimeter seal includes a sealing rib which provides said liquid resistant seal between said tap-off base and said busway housing.

* * * * *